United States Patent [19]
Hayashi

[11] 3,958,962
[45] May 25, 1976

[54] ELECTROSTATIC PRECIPITATOR

[75] Inventor: Tsutomu Hayashi, Yokohama, Japan

[73] Assignee: Nafco Giken, Ltd., Tokyo, Japan

[22] Filed: Oct. 15, 1973

[21] Appl. No.: 406,159

Related U.S. Application Data

[63] Continuation-in-part of Ser. No. 347,385, April 3, 1973, abandoned.

[30] Foreign Application Priority Data
Dec. 30, 1973  Japan................................. 48-1359

[52] U.S. Cl......................................... 55/148; 55/2; 55/138; 55/152; 55/154
[51] Int. Cl.²........................................... B03C 3/24
[58] Field of Search............ 55/136, 137, 138, 139, 55/150, 151, 152, 154, 148, 2

[56] References Cited
UNITED STATES PATENTS

| | | | |
|---|---|---|---|
| 1,024,784 | 4/1912 | Johnson, Jr. | 55/DIG. 38 |
| 1,913,784 | 6/1933 | Wintermute | 55/139 |
| 2,129,783 | 9/1938 | Penney | 55/118 X |
| 2,195,431 | 4/1940 | Shively et al. | 55/152 X |
| 2,698,669 | 1/1955 | Wintermute | 55/138 |
| 2,881,857 | 4/1959 | Cosby et al. | 55/152 X |
| 3,218,781 | 11/1965 | Allemann et al. | 55/122 |
| 3,706,572 | 12/1972 | Gourdine et al. | 55/138 |
| 3,765,154 | 10/1973 | Hardt et al. | 161/164 X |
| 3,803,808 | 4/1974 | Shibuya et al. | 55/154 X |

FOREIGN PATENTS OR APPLICATIONS

| | | | |
|---|---|---|---|
| 401,997 | 7/1967 | Australia | 55/152 |
| 500,574 | 1/1951 | Belgium | 55/152 |
| 627,068 | 7/1949 | United Kingdom | 55/136 |
| 546,617 | 7/1942 | United Kingdom | 55/152 |
| 553,420 | 5/1943 | United Kingdom | 55/152 |
| 873,565 | 7/1961 | United Kingdom | 55/151 |

OTHER PUBLICATIONS

German Printed Application No. 2,018,447, Anmeldetag 4–17–70, (9 pp. spec., 4 sht. dws.).
Quitter, Volker, "Electrostatic Separation of SO$_3$ Mists", Staub–Reinhalt Luft, Vol. 30, No. 4, Apr. 1970, pp. 8–10.

*Primary Examiner*—Bernard Nozick

[57] ABSTRACT

An electrostatic precipitator with at least one pair of spaced, flat-plate grounded dust collecting electrodes and a floating, insulated dust collecting flat-plate electrode arranged in the center of each space between the grounded dust collecting electrodes parallel to the gas flow and provided at its edges at fixed intervals with sets of needle-shaped discharge electrodes.

The needles are fabricated along an outer longitudinal edge of a channel bracket member by welding or the like at precise equal spacings. Plural bracket members are riveted along the respective leading and trailing edges of each floating flat electrode plate in such a fashion that the tips of the needles are aligned vertically in the precipitator chamber. The diameter of the needle-shaped discharge electrodes is smaller than approximately 5 mm and the tips of the needle-shaped electrodes have a maximum radius of approximately 0.5 mm while the intervals between the needle-shaped discharge electrodes is smaller than the distance between the grounded dust collecting electrodes and the floating dust collecting electrodes.

4 Claims, 8 Drawing Figures

ELECTROSTATIC PRECIPITATOR

This application is a continuation-in-part of my application Ser. No. 347,385, filed Apr. 3, 1973, now abandoned.

BACKGROUND OF THE INVENTION

1. Field of the Invention

This invention relates to improved elastrostatic precipitators for collection of dusts from industrial effluent gases.

2. Description of the Prior Art

The prior art electrostatic precipitators, hereafter called E.P., for dust collection from industrial effluent gases in general have the following disadvantages:
1. Dust particles of high resistivity of of higher than about $10^{11}$ ohm-cm. cannot be collected, except at extremely low, impractical efficiencies.
2. Relatively slow gas flow velocities and wide interelectrode spacings used necessitate E.P. of large overall dimensions, resulting in high equipment cost and large, expensive installation space.
3. Requirement of high tension voltages of 50KV or more cause electrical insulation breakdowns and necessitate the use of expensive high-tension rectifier equipment.
4. The use of such high-tension voltages and the use of non-uniform electrical fields in dust precipitation results in frequent flashovers, which necessitate using high-tension rectifier equipment of large current capacities with inherent high costs.
5. The use of negatively charged wire discharge (ionizing) electrodes, which also act as collecting electrodes for positively charged dust particles, necessitate frequent rapping of these wire discharge electrodes to remove the dust collected on the wires and thereby prevent impediment of ionization. This frequent rapping results in reentrainment of the collected dust back into the gas flow, thereby lowering the overall collecting efficiency of E.P.
6. The wire discharge electrodes become damaged from the mechanical shock and vibration of frequent rapping, and this necessitates shutdown of E.P. and expensive repair and replacement work, in addition to the inconvenience and the high cost of disruption of the manufacturing process during E.P. shutdown.
7. Generation of large quantities of harmful ozone and oxides of nitrogen because of use of negative discharge electrodes at high voltages.

SUMMARY OF THE INVENTION

This invention eliminates the above mentioned disadvantages inherent in the industrial E.P. of the prior art, and moreover has additional advantages. The main features of this invention lie in success in design of electrostatic precipitators of light weight and compactness, resulting in savings in installing space and reduction of the foundation construction cost, the operating voltage used being ½ of that for the conventional electrostatic precipitator. Moreover the power consumption is 1/5 – 1/10 of that of the conventional electrostatic precipitator, resulting in providing full economical merits. At the same time, generation of injurious ozone is reduced to the non-injurious level by means of employing the positive polarity discharge electrodes with negative polarity collecting electrodes.

An important feature of the invention, hereinafter disclosed, resides in the structural arrangement of the discharge electrode needles whereby the plural needle tips are aligned vertically and fastened at the forward and rearward edge of a metal plate, spaced therealong at precise, equal intervals. In the use of steel plate of larger sizes, such as furnished as mill plate, there is often a camber or curvature on opposite edges of the plate. The invention provides a convenient, economical means for mounting sharp needle electrodes along the edges to overcome the lack of a true vertical edge or surface of the plate. Brackets are formed from metal strips into elongated U-shaped channels. The sharp needles of equal length and size are fastened to the outer longitudinal surface along the bottom of the U of the channel members at the prescribed intervals. The channels are of convenient length, say four or six feet, and nested over the edge of the plate. The channels are riveted or otherwise fastened onto the plate with the needle tips pre-aligned; thereby overcoming any curvature or camber of the plate edge in installing the needle discharge electrodes in a true vertical alignment.

The needles of the discharge electrode operate most efficiently in the electrostatic precipitator when sharp. The operating life of the unit is therefore related to the ability of the needles to resist wear and maintain sharpness of their points. Another feature of the assembly of the discharge electrode just mentioned is making the needles of a longer wearing material; yet, using a less expensive material for the plate portion of the electrode. A suitable material for use in fabrication of the needles, adjusting cost of material to life and maintenance, is a low carbon stainless steel from which I fabricate the needles and the channel bracket members. The plates of the electrode are made of a least expensive steel plate. The channel brackets provide a convenient and inexpensive means for assembly of the needles onto the steel plate, the two elements being of dissimilar metalic composition.

The invention provides an electrostatic precipitator with at least one pair of spaced, flat-plate grounded dust collecting electrodes and a floating, insulated dust collecting flat-plate electrode arranged in the center of each space between the grounded dust collecting electrodes parallel to the gas flow and provided at its edges at fixed intervals with sets of needle-shaped discharge electrodes. The diameter of the needle-shaped discharge electrodes is smaller than approximately 5 mm and the tips of the needle-shaped electrodes have a maximum radius of approximately 0.5 mm while the intervals between the needle-shaped discharge electrodes is smaller than the distance between the grounded dust collecting electrodes and the floating dust collecting electrodes.

This invention provides the means for collection of particles of high resistivity exceeding the $10^4$ ohm-cm. – $10^{11}$ ohm-cm. range of electrical resistivity, which theoretically cannot be collected by conventional types of electrostatic precipitators. For the purpose of perfect collection of such high resistivity substances as heavy metal oxides, their compounds, especially, lead oxide (PbO), lead sulfate (PbSO$_4$) exceeding $10^{14}$ ohm-cm., this invention provides a new type of electrostatic precipitator with a different construction, by basically improving the conventional type of electrostatic precipitator, with disregard to the theory and construction features of conventional type of electrostatic precipitators.

DESCRIPTION OF THE PREFERRED EMBODIMENTS

Figure 1:
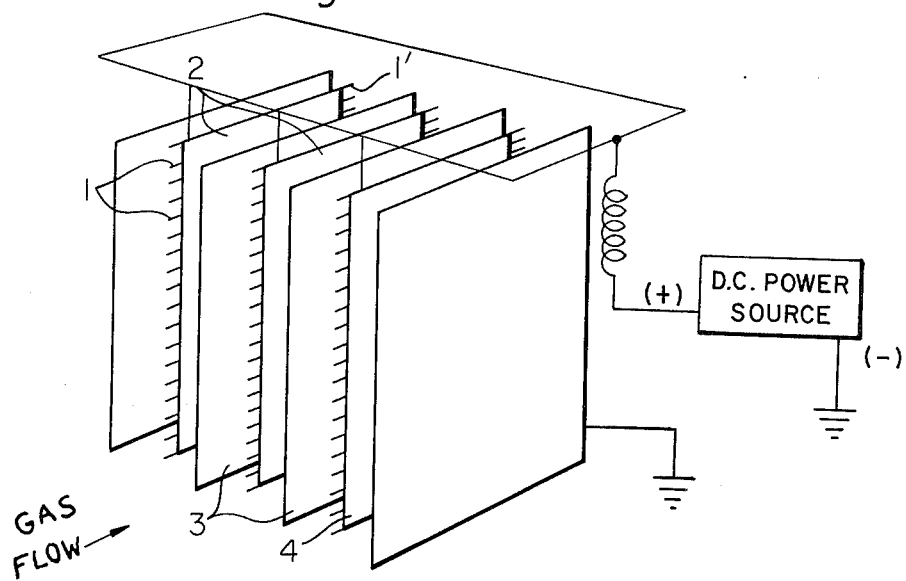
FIG. 1 is a perspective view indicating the new basic construction of this invention.

The details of this invention and the advantages will be explained with reference to the drawing showing the preferred embodiments of the invention.

Figure 2:
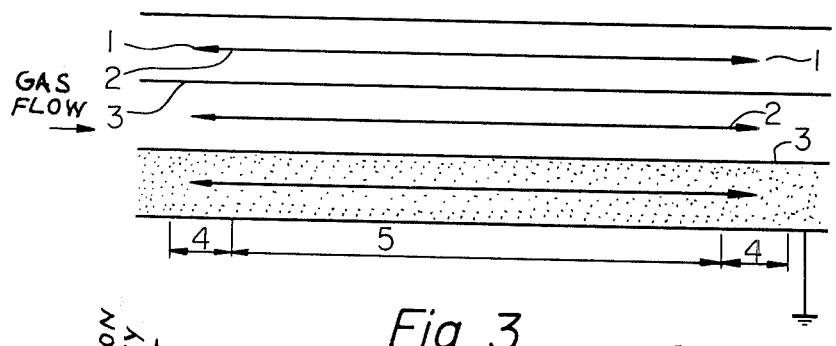
FIG. 2 is a plan view of FIG. 1.

In this invention, the ionization is accomplished by sharp-pointed needle discharge electrodes 1 in FIG. 1, which are placed in between plate-shaped collecting electrodes 3. These needle electrodes are placed a little backward (toward the exit of gas flow) from the front edges of the plate-shaped collecting electrodes 3, as shown in FIG. 1, so that ionizing fields are formed by the non-uniform electric fields between the needle points 1 and the leading edge parts 4 of the collecting electrodes 3 as shown in FIG. 2.

The orientation and dimensional relationship of the electrodes and needles in the electrostatic precipitator system are quite significant in obtaining the results expected from this invention.

The key to all relationships in the spacing and sizes of the parts is dependent upon the spacing between a set of plates comprised of a collector plate 3 and a discharge electrode plate 2. Let the spacing between the plates be represented by the variable X. The dimention X will be selected to correspond with the particulate matter in the gas stream flowing through the precipitator unit and the grain size of the particulate matter, and in most uses is between 62.5 and 87.5 mm. The other dimensions in the unit with reference to FIGS. 1, 2 and 7 of the drawings are expressed in terms of the following:

Let $Y$ equal the width of the discharge plate 2,
Let $Z$ equal the width of the collector plate 3,
Let $S$ equal the space between needle tips; and
Let $L$ equal the length of the needles.

The crucial relationships in calculating $Y$, $Z$, $S$ and $L$ in mm are:

$Y = 10 X$ $Z = Y + 300$ mm ($\pm 25$ mm)

$S = \frac{1}{2} X$ $L = \frac{3}{4} X$

As an example, if the plate spacing is 7.5 mm ($X = 75$), $Y$ is 750 mm, $Z$ is 1050 mm, $S$ is 37.5 mm and $L$ is 56 mm. The setback in the direction of gas flow of the needle tip of the nearby edge of the collector plate 3 in this example is $150 - L$ or approximately 94 mm. The setback in this direction of the nearby edge of the plate 2 from the corresponding front or back edge of plate 3 is $\frac{1}{2}(Z - Y)$ or 150 mm ($\pm 25$ mm). The needle electrodes 1 are connected to the positive side of the high tension rectifier set, which carry voltages of under 50KV. The plate collecting electrodes 3 are connected to the negative side of the rectifier set and are also grounded through the ground terminals. The positive plate collecting electrodes 2 are placed back of and in line with the needle electrodes 1 and are attached integrally with the needle electrodes 1, so that the plate collecting electrodes 2 are also connected to the positive potential of the rectifier set. Thus the negative plate collecting electrode 3 and the positive plate collecting electrode 2 form the uniform electric field as shown in FIG. 2.

Figure 3:
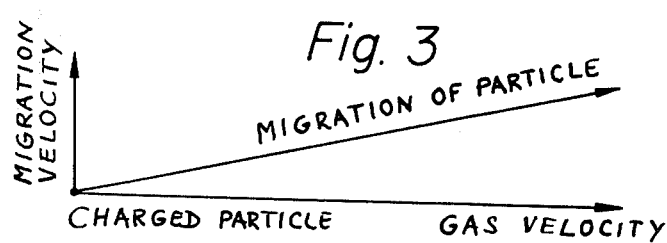
FIG. 3 shows the particle velocity as affected by the gas velocity and by the migration velocity of the particle produced by the effect of the Coulomb force upon the charged particle located in the non-uniform electric field of FIG. 2.

When the E.P. is energized, with the needle electrodes 1 and the positive collecting electrodes 2 at positive potential and the negative collecting electrodes 3 at negative potential, ionization takes place at the sharp points of the needle electrodes 1 in the non-uniform field shown in FIG. 2, and both positive and negative ions are formed. Then, when the dust laden gases are passed through the E.P., the dust particles pass through this ionized field and are charged either positively or negatively. These charged particles continue to be carried downstream by the gas flow and are carried past the needle points of the needle electrodes 1. At the same time the electric wind generated at the needle points also contributes to blowing the charged dust particles away from the needle point. The negatively charged dust particles, which are blown past the sharp points of the needle electrodes 1, are attracted to and collected by the positive collecting electrodes 2, by the Coulomb force action of the uniform electric field, formed between the positive collecting electrodes 2 and the negative collecting electrodes 3, upon the negatively charged particles. This motion of the charged dust particles toward the collecting plates, caused by the Coulomb force action of the electric field upon the charged dust particles is known as migration, and the speed of this migration is known as the migration velocity. The migration velocities of various types of charged dust particles are dependent upon various factors, such as mass of the particle, strength of the charge, strength of the electric field, etc., but normally the migration velocities in E.P. are of the order of about 25cm/sec. or less. On the other hand, the gas velocities in E.P. are of the order of about 0.5 meter/sec. — 3 meters/sec. Thus, the negatively charged particles would be carried past the needle electrodes 1 in a direction determined approximately by the vector sum of the migration velocity and gas velocity, as shown in FIG. 3.

The positively charged dust particles, on the other hand, are repulsed by the positively charged needle electrodes 1 and are attracted toward the negative collecting electrodes 3. Therefore the sharp points of the needle electrodes 1 are kept free from collection of positively charged dust particles. Also, the positively charged dust particles, which are attracted to the negative collecting electrodes 3, move in a direction determined approximately by the vector sum of the migration velocity and the gas velocity just as in the case of the negatively charged dust particles, as explained above, and therefore are carried past the leading edge parts 4 of the negative collecting electrodes 3. Therefore, the leading edge parts 4 of the negative collecting electrodes 3 are also kept free from collection of positively charged dust particles. Since the negatively charged dust particles are repulsed by the negative collecting electrodes 3, there is no collection of negatively charged dust particles onto any part of the negative collecting electrodes 3.

Thus, both the sharp points of the needle electrodes 1 and the leading edge parts 4 of the negative collecting electrodes 3 are kept free from collection of either positively or negatively charged dust particles. Because of this fact, the back-corona phenomenon, caused by the accumulation of high resistivity dusts of about $10^{11}$ ohm-cm and over onto the discharge and collecting electrodes in the E.P. of the prior art, is prevented from occurring, and this makes possible the high efficiency collection of these high resistivity dusts in the E.P. of this invention.

In the case of the E.P. of the prior art, with discharge wire electrodes located at intervals along the entire lengths of the collecting electrodes of the plate-type, or with discharge wire electrodes strung along the center of the entire lengths of the pipe-type collecting electrodes, even though the charged dust particles are blown past the leading edge parts of the collecting electrodes and the leading wire discharge electrodes, the charged particles will be collected onto the adjacent downstream parts of the collecting electrodes and the adjacent downstream discharge wire electrodes. Thus, back-corona phenomenon occurs when the dust particles are of high resistivity, in the E.P. of the prior art.

In the E.P. of the prior art, the gas velocities had to be kept low, since high gas velocities would cause vibration and swinging of the wire discharge electrodes with consequent breaking of the wire discharge electrodes, or would cause occurance of flashover whenever the wire discharge electrodes swing close to the collecting electrode surfaces. In addition, the swinging or vibrating of the discharge wire electrodes, which also act as collecting electrodes to collect positively charged dust particles in the E.P. of the prior art, causes the collected dust particles to become loosened and reentrained into the gas stream, thereby reducing the overall collecting efficiency. The spacing between the wire discharge electrodes and the collecting electrodes, too, had to be kept wide to prevent excessive sparking and flashovers caused by the close proximity of vibrating or swinging wire discharge electrodes to the collecting electrode surfaces. In the present invention, the needle discharge electrodes 1 are rigidly attached to the positive collecting electrodes 2 and therefore do not vibrate or swing from the effects of gas flow. Therefore, high gas velocities can be used without any damage to the discharge electrodes or sparking or flashovers caused by the vibrating or swinging of the discharge electrodes. Also, since the needle discharge electrodes 1 are used only for ionizing and not for collecting of dust particles, there is no reentrainment problem even at high gas velocities. In addition, the interelectrode spacings between the positive electrodes 1 and 2 and the negative electrodes 3 could be made narrower, since there are no vibrating or swinging discharge electrodes, which require wide interelectrode spacings. Moreover, the closer interelectrode spacings permit maintaining high voltage gradients between the electrodes even at reduced voltages. This, of course, means that high collecting efficiencies can be maintained in the collecting fields between the positive collecting electrodes 2 and the negative collecting electrodes 3, even at lower voltages.

The use of higher gas velocities and closer interelectrode spacings as mentioned above both permit designing E.P. of smaller cross-sectional areas with consequent reduction in the manufacturing costs.

In the present invention the sharp points of the needle discharge electrodes 1 are sharper pointed than the discharge surfaces of the wire discharge electrodes of the E.P. of the prior art, and therefore are more efficient in ionization. Also the needle discharge electrodes 1 remain sharp as explained above, whereas the wire discharge electrodes in E.P. of the prior art collect dust particles on the wire surfaces, thereby reducing the sharpness of the ionizing surface and therefore also reducing the ionization. In the E.P. of the prior art, high voltages had to be used to overcome such defects of reduced ionization. In this invention, low voltages of under 50KV can be used, since the ionization is kept high and constant by the constantly sharp points of the needle discharge electrodes 1. Also, the possibility of using smaller spacings between the discharge and collecting electrodes in this invention, as explained in page 7, 4th paragraph, further makes it possible to lower the voltage without reducing the collecting efficiency. The use of lower voltages eliminates the difficult and troublesome electrical insulation breakdown problems and cuts down the cost of the high-tension rectifier equipment.

Use of low voltages in ionization and collection electric fields in this invention greatly reduces the excessive sparking and flashovers normally encountered in the E.P. of the prior art, and thereby reduces the current consumption. Also the uniform electric field between the positive 2 and negative collecting electrodes 3, as shown in FIG. 2, makes the thicknesses of the dust collected on these collecting electrodes uniform, and this also eliminates the sparking and flashovers which normally occur in case of the E.P. of the prior art because of the irregular surfaces of the non-uniform thicknesses of dusts collected in non-uniform fields. These facts serve to reduce the current consumption to about 1/10 of that normally required in the E.P. of the prior art of equivalent capacity and collection efficiency.

Since the needle discharge electrodes 1 remain sharp constantly, there is no necessity of the frequent rapping as is necessary in the case of the wire discharge electrodes of the E.P. of the prior art. Therefore, reentrainment of dust particles into the gas stream caused by the tapping is greatly reduced. The uniform field between the positive 2 and negative collecting electrodes 3, shown in FIG. 2, makes the thicknesses of the collected dust uniform and this permits larger quantities of dusts to be collected on the positive collecting electrodes 2 and negative collecting electrodes 3 before rapping becomes necessary. In the case of the non-uniform collecting fields in the E.P. of the prior art, frequent rapping becomes necessary to prevent sparking and flashovers that occur from the high spots of the non-uniform thickness dust layers on the collecting electrodes and wire discharge electrodes. Thus, less frequent rapping is sufficient for the collecting electrodes 2 and 3 of this invention, and this results in less dust particle reentrainment and higher overall collecting efficiency for the E.P.

Figure 6:
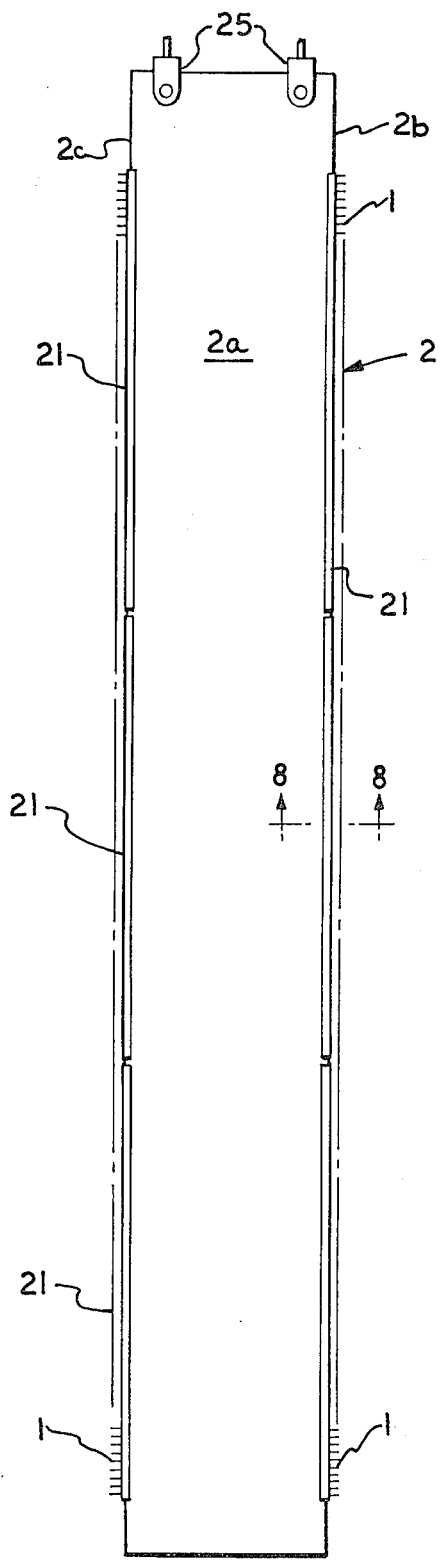
FIG. 6 is a side elevational view of the novel structure of floating, insulated, dust-collecting flat-plate electrode utilized in the electrostatic precipitator of the invention.
Figure 7:
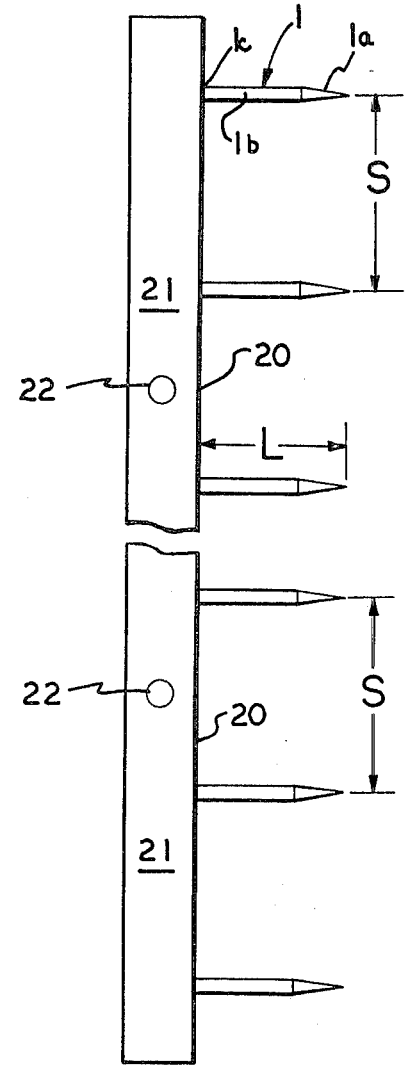
FIG. 7 is an enlarged side elevational view of the channel member, needle bracket assembly utilized in the invention as a part of the electrode of FIG. 6.
Figure 8:
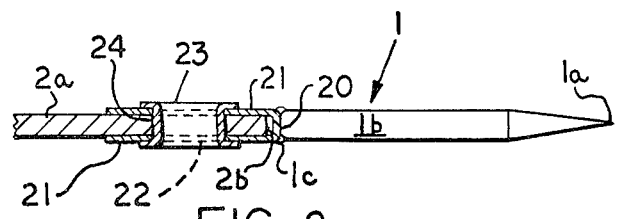
FIG. 8 is a sectional plan view taken along line 8—8 of FIG. 6, showing the assembly of the plate and needle bracket member thereon.

The configuration of the discharge electrodes 1 of the invention remain sharp at all times and are attached to the positive collecting electrodes 2. The needles 1 are constructed of a durable material that is an electrical conductor, such as platinum or stainless steel. Needles 1 are preferably circular in cross-section, smaller in the body portion 1a than 5mm. in diameter and pointed at the exposed end 1b. The radius at the free end or tip 1b of the needle should be a maximum of approximately 0.5mm. Needles 1 are butt welded at their blunt end 1c on the longitudinal edge surface 20 of the U-shaped channel bracket member 21 (FIG. 7). The successive needles 1 therealong are located at a common spacing S therebetween. The spacing S is less than the spacing between a grounded dust-collecting electrode plate 3 and a positive electrode plate 2; for example, the spacing between adjacent electrodes 2 and 3 may be on the order of 3 inches and spacing S between needles should be less than 3 inches, say 1 inch and half. The bracket 21 is shaped substantially as a U in cross-section, and as seen on FIG. 8, steel plate 2a is inserted between the legs of the U so that bracket 21 is nested along the edge of plate 2a. Bracket 21 is made to a suitable length, such as 6 feet, and three such brackets are attached to one edge of the plate of the example shown on the drawings. The sides of the bracket have plural holes 22 formed in them to accommodate the rivet 23. The plate 2a of the positive plate electrode 2 has holes 24 formed along the edge in true vertical alignment. The rivets 23 are fastened through the plate holes 24 and holes 22 in the bracket (FIG. 8) so as to connect bracket 21 and the needles 1 thereon in vertical alignment along the opposite edges 2b and 2c (FIG. 6) of the plate 2a.

The plate 2a is installed in the electrostatic precipitator with the needle assemblies thereon and suspended on the hangers 25 at the upper end of the plates. Hangers 25 are connected for operation with a rapping device for periodically clearing the electrode plates 2 of particles collected thereon. Plates 2 are mounted in the electrostatic precipitator in an alternating series as illustrated on FIGS. 1, 2 and 4.

Since the needle discharge electrodes 1 remain sharp at all times, and moreover are rigidly attached to the positive collecting electrodes 2, there is no necessity of frequent repair and replacement of the discharge electrodes, as happens in the case of the E.P. of the prior art. This reduces the maintenance cost of the E.P. considerably. However, in the construction provided in the present invention, needle replacement is relatively easy and requires minimal down time. In the event needles 1 need to be replaced, the bracket member 21 holding the particular needle or needles to be replaced is removed by shearing its rivets 23. A new replacement bracket 21 with new needles 1 thereon is then riveted in its place and the unit is ready to resume operation.

The highly efficient ionization at comparatively low voltages and low current consumption made possible in this invention permit the use of positive voltage on the needle discharge electrodes. Because of the inherent nature of the positive corona discharge, ozone generation in the E.P. is reduced to about 1/10 as compared to the E.P. of the prior art of comparable capacity and collection efficiency which use the negative corona discharge. In turn, production of oxides of nitrogen is greatly reduced, thereby preventing a secondary pollution by nitrogen oxides expelled by the E.P.

The narrower interelectrode spacing between the positive collecting electrodes 2 and negative collecting electrodes 3 makes it possible to maintain a high voltage gradient between the positive 2 and the negative collecting electrodes 3 even when a lower voltages of under 50 KV are applied. Thus the migration velocities of the negative and positively charged dust particles can be maintained at higher levels as compared to those in the E.P. of the prior art. Also, even when the migration velocities of the charged dust particles are kept the same as for the E.P. of the prior art, the charged dust particles reach the corresponding collecting electrodes faster because of the closer interelectrode spacing and resultant shorter distance of migration. This, of course, also contributes to higher E.P. collecting efficiency. This is especially important in the case of the difficult-to-collect dust particles of submicron range.

The use of the uniform field between the positive collecting electrodes 2 and the negative collecting electrodes 3, as shown in FIG. 2, produces uniform thickness dust layers on the collecting electrodes, as explained in page 10, 2nd paragraph, rather than the irregular thicknesses that occur in the E.P. of the prior art, and this fact also permits closer interelectrode spacings between the positive collecting electrodes 2 and the negative collecting electrodes 3. In addition, both the positive 2 and negative collecting electrodes 3 in this invention are in the shape of plates and therefore have larger total collecting surface areas, as compared to the wire discharge electrodes (which are also used for collecting), and the plate-shaped or pipe-shaped collecting electrodes in the E.P. of the prior art. Therefore, the collecting electrodes of this invention can be made much shorter, because of the larger collecting surfaces available per unit length of the collecting field. The narrower inter-electrode spacings possible and the shorter collecting fields possible and in addition the high gas velocities possible all contribute to reducing the overall volume of the E.P. and therefore the manufacturing cost, the installation cost and the installation space. Comparatively low voltages used and the low current consumption in the E.P. of this invention permit the use of compact and lightweight high-tension rectifier power supply units, which can be fitted into the high-tension insulator compartments of the E.P., thereby eliminating the necessity of installing the high-tension rectifier power supply units in special power supply rooms with high-tension cables connecting the E.P. to the power supply units, as normally done in the case of the E.P. of the prior art.

As explained above, the charged particles in the electric field are carried in the direction determined approximately by the vector sum of the migration velocity and gas velocity, so that the theoretically necessary length of the collecting electrodes with reference a given gas velocity, and also the necessary interelectrode spacing between the positive and negative collecting electrodes can be determined from the migration velocity of the charged particles and the magnitude of the gas velocity.

Therefore, if there is one unit of the construction shown in FIG. 1, it is theoretically possible to sufficiently serve the purpose. However, in case of the E.P.

for use on industrial effluent gases, the dust contents of gases are generally high, so that heavy dust layers become precipitated onto the surfaces of both positive and negative collecting electrodes 2 and 3, making the interelectrode spaces between the two electrodes narrow in a relatively short time, and it becomes necessary to remove the precipitated dust layers from the positive and negative collecting electrodes by application of vibrations or mechanical shocks or by washing or flushing or other methods, as often as dictated by the dust content of the gases, thereby dropping the precipitated dust layers into the dust hoppers provided in the lower part of E.P.

Figure 4:
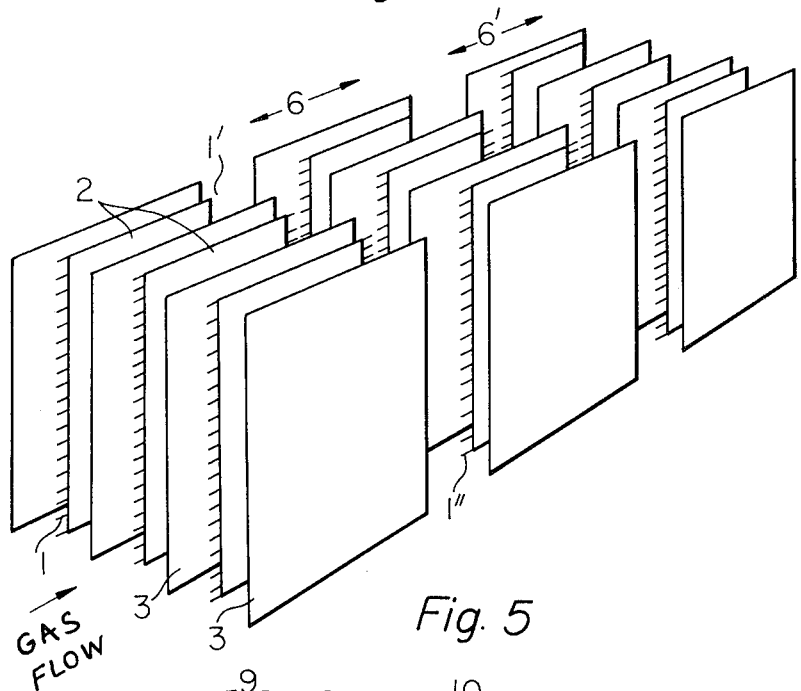
FIG. 4 is a schematic perspective view of a plurality of E.P. units according to the invention.
Figure 5:
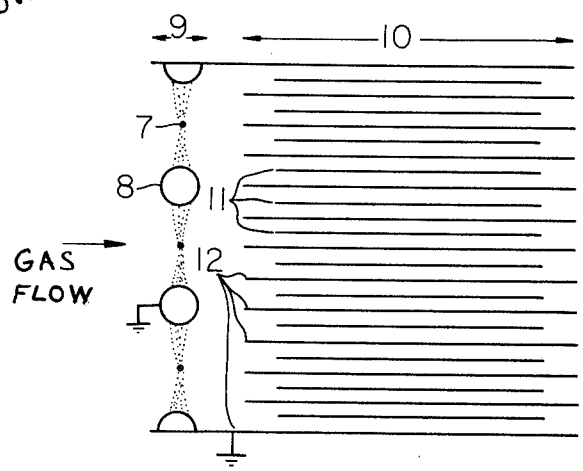
FIG. 5 is a plan view for indicating the construction of the well-known electric air cleaner for indoor use.

When vibrations or mechanical shocks are applied to the positive and negative collecting electrodes as explained above, the fine dust particles precipitated onto the collecting electrodes will drop off in large pieces because of coagulation of dust particles during precipitation, but a part of the loosened dust particles becomes reentrained into the gas stream as explained above, and is carried downstream. To collect these reentrained dust particles, a number of ionizing-collecting sections 6 and 6' can be installed on the downstream side as shown in FIG. 4, thereby effectively preventing the detrimental effects of reentrainment.

The needle discharge electrodes 1' fixed to the downstream side of positive collecting electrodes 2, as shown in FIG. 1, are effective in furnishing electric charges to the reentrained dust particles, and the dust particles which receive charges at this point are collected by the negative collecting electrodes adjacent to the needle discharge electrodes 1'. However, the negatively charged and the uncharged dust particles travel in the gas stream to the ionizing-collecting section 6 of the same type as the first section, which is installed in the s second section of E.P. The needle discharge electrodes 1'' in the second section recharge the dust particles still remaining in the gases flowing around the needle discharge electrodes 1'', and these charged dust particles are precipitated onto the positive and negative collecting electrodes located downstream. The above process is repeated in the downstream section 6' of the E.P. and thereby high efficiency precipitation is effected. By increasing or decreasing the number of E.P. sections employed and also the gas velocity, it is possible to obtain collecting efficiencies of over 99.999% even in case of Cadmium Oxide (CdO).

The purpose of this invention lies in the fundamental improvement of the electrostatic precipitators for industrial uses, but the operating principle of this invention lies in the application of the attraction between positive and negative poles of static electricity, and because of this, it is difficult to judge the difference between this invention and the conventional types of electrostatic precipitators merely from the external appearance, and rather, there is similarity between them in the external appearance.

It is a well-known fact that electrostatic precipitators display superior capacity as equipment for elimination of air pollution. The electrostatic precipitator has been variously called "electronic precipitator" or "electric precipitator". Many improvements have been made for the precipitator in order to increase the efficiency of dust collection. But, most of the improvements concern the construction of the dust collecting electrodes or types of discharge electrodes or accessory devices. There are electrostatic precipitators of the duct type and the tube type according to the purpose of use. In the duct type, plural flat plates, which are arranged in parallel, are arranged at fixed intervals, and in the tube type, many cylinders of the same fixed diameter are provided in vertical position or else plural cylinders of different diameters are arranged concentrically at fixed intervals. However, all of these types, employ the positive polarity collecting electrodes, which are connected to the ground terminal. And these positive collecting electrodes with negative polarity discharge wire electrodes suspended vertically between them comprised the original Cottrell type electrostatic precipitator invented about 1906. Using this basic design, many improvements have been made, such as pockets for prevention of reentrainment of dust particles, various designs for prevention of warping of the collecting electrodes, and other improvements. Furthermore, there have been many other proposals, i.e. the cross-section of the wire discharging electrode was made square, triangular or star-shaped, or these were twisted, or some had the construction of barbed wire, or the surfaces of the wires have protrusions, or L-angle members or flat plates were provided with protrusions.

The purpose of all of these improvements in the discharge electrode wires is to improve the corona discharge from the sharp points on the wires. It is a well-known fact that the smaller the diameter of the wire, the easier it is to obtain the corona discharge, but, there is a limitation in size because of the necessary mechanical strength.

The discharge electrodes of conventional electrostatic precipitators for industrial uses are of negative polarity and the dust collecting electrodes are of positive polarity. However, such an arrangement was unavoidable in view of the fact that when positive discharge electrodes with negative collecting electrodes are used, normally spark flashovers readily occur and as result it is impossible to obtain a high collecting efficiency.

About 1936, Dr. Gaylord W. Penney of Pittsburgh, Pa., invented an electrostatic precipitator which is entirely different from the conventional Cottrell type. In the conventional electrostatic precipitators for industrial uses, large quantities of ozone are produced, making them unsuitable for use in air purification for indoor uses. However, improvements in the design and the employment of reversed polarities for the discharge and collecting electrodes in the Penney-type precipitator made it possible to collect extremely small dust particles floating in the air at high efficiencies and with small current consumption.

In the Cottrell type, if the discharge electrode is not negative, high dust collection efficiency cannot be obtained. In the Penney-type, slender wires having smooth surfaces and a diameter of 0.15 mm – 0.8 mm (0.6 mil – 32 mil) are used as positive discharge electrodes 7, and cylindrical electrodes (large electrodes) are provided as grounded negative electrodes 8 alongside the positive discharge wires (small electrodes). The diameter ratio of large electrode and small electrode is 500:1 – 1,000:1, and the ratio of inter-electrode distance of the two electrodes to the diameter of the discharge wire is from 500:1 to 100:1.

In the Penney-type precipitator, when the dust particles in the air pass through the independently arranged ionization section 9, electrons and positive ions attach to the dust particles. Almost no dust is collected on the positive discharge wire 7 and when the negatively charged particles flow between the comparatively narrowly-spaced positive collecting electrode 11 and the negative collecting electrodes 12 located in the collecting section provided downstream, they are collected onto the positive collecting electrodes 11. The positively charged dust particles are collected on the negative electrode 8 and the negative collecting electrodes 12.

This type of equipment is called the "electric" type, "electronic" type or "electrostatic" type air cleaner or air purification equipment. Because the ionization section 9 and the dust collecting section 10 are independently arranged, this type is called the 2-stage charging type as against the 1-stage charging type for the Cottrell precipitators.

Generally, one-stage charging type design is adopted for the industrial E.P. and the two-stage charging type design for the air purification purposes. However, the electric air cleaner is generally very small in size so that the ionization section 9 and dust collecting section 10 are incorporated into one piece. The distance between positive discharge electrode 7 of the ionization section 9 and grounded negative electrode 8 is approx. 30 mm and the distance between the positive 11 and negative collecting electrode 12 of the dust collection section 10 is approx. 10 mm.

Accordingly, the voltage applied on the ionization section 9 are of the order of 10 KV – 12 KV and those applied on the collecting section are about 3 KV – 6 KV.

As described hereabove, there is a distinct difference in the uses between the industrial E.P. and the electrostatic air cleaner, and also the structural designs are entirely different. There are also incomparable differences in the devices used and in the dimensions of the equipments. Even if the industrial E.P. is scaled down in size, or the electric air cleaner is scaled up in size, it is impossible to use them for the reverse purposes. Thus, it is not a matter of size only.

The electrostatic precipitator in this present invention is completely different from both the improved designs of the conventional E.P. and the electric air cleaners used for indoor environmental cleaning. The purpose, constructional components and operating efficiency, as described above, make it possible to remove the dust particles which were impossible or not fully possible to collect with the conventional E.P. or the electric air cleaners.

What is claimed is:

1. An electrostatic precipitator having a fluid inlet, a fluid outlet and a discharging port for collected dust, comprising: a gas passage following said fluid inlet, at least one pair of spaced, flat-plate, conductive first electrodes in said passage, a flat-plate, conductive, second electrode insulated from said first electrodes and arranged in the center of each space between said first electrodes parallel to the gas flow and provided at its edges at fixed intervals with sets of needle-shaped discharge electrodes extending in the plane of said second electrode on opposite sides thereof, one set of needle-shaped electrodes facing the gas flow and the other set facing in opposite direction, said first electrodes and said second electrodes being placed in parallel to each other at substantially equal intervals, the diameter of said needle-shaped discharge electrodes being smaller than approximately 5mm and the tip of the needle-shaped electrodes having a maximum radius of approximately 0.5mm, the intervals between the needle-shaped discharge electrodes being smaller than the distance between said first electrodes and said second electrodes, and means selectively connecting the needle-shaped discharge electrodes and said second electrodes and said first electrodes in a DC circuit to charge them respectively at opposite electrical polarity.

2. An electrostatic precipitator having a fluid inlet, a fluid outlet and a discharging port for collected dust, comprising; a gas passage following said fluid inlet, at least one pair of spaced, flat-plate grounded dust collecting electrodes in said passage, a floating insulated dust collecting flat-plate electrode arranged in the center of each space between said grounded dust collecting electrodes parallel to the gas flow and provided at its edges at fixed intervals with sets of needle-shaped discharge electrodes extending in the plane of said electrode on opposite sides thereof, one set of said needle-shaped electrodes facing the gas flow and the other set facing in the opposite direction said needle-shaped electrodes being circular in cross section, said grounded dust collecting electrodes and said floating dust collecting electrode being placed in parallel to each other and a plurality of said electrodes being spaced at substantially equal intervals, and means selectively connecting the needle-shaped discharge electrodes and the floating dust collecting electrodes and the grounded dust collecting electrodes in a DC circuit to charge them respectively at opposite electrical polarity.

3. An electrostatic precipitator according to claim 2, wherein the diameter of said needle-shaped discharge electrodes is smaller than approximately .5 mm and the tip of the needle-shaped electrodes has a maximum radius of approximately 0.5 mm.

4. An electrostatic precipitator according to claim 2, wherein the intervals between the needle-shaped discharge electrodes is smaller than the distance between the grounded dust collecting electrodes and the floating dust collecting electrodes.

\* \* \* \* \*

UNITED STATES PATENT AND TRADEMARK OFFICE
CERTIFICATE OF CORRECTION

PATENT NO. : 3,958,962
DATED : May 25, 1976
INVENTOR(S) : Tsutomu Hayashi

It is certified that error appears in the above—identified patent and that said Letters Patent are hereby corrected as shown below:

[30] Foreign Application Priority Data

December 30, 1972   Japan   48-1359

Signed and Sealed this

Twelfth Day of April 1977

[SEAL]

Attest:

RUTH C. MASON
Attesting Officer

C. MARSHALL DANN
Commissioner of Patents and Trademarks